A. S. BIXBY.
MOLDING MACHINE.
APPLICATION FILED JULY 21, 1916.
1,252,771.
Patented Jan. 8, 1918.
6 SHEETS—SHEET 1.
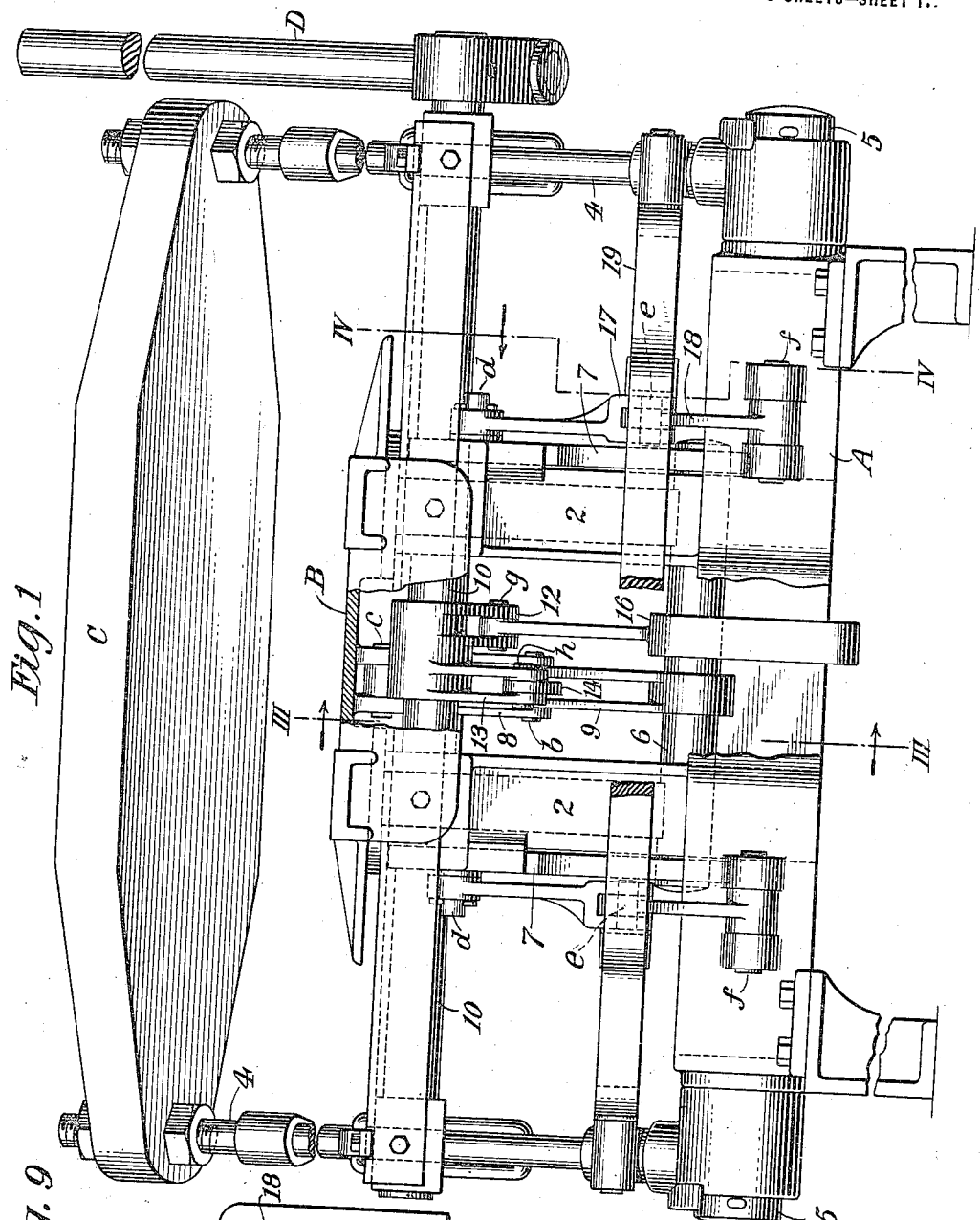
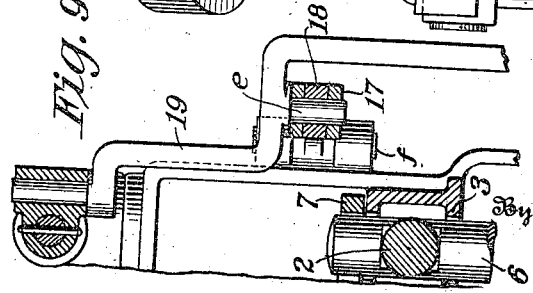
Inventor
Allan S. Bixby
By his Attorney
Clarence D. Kent

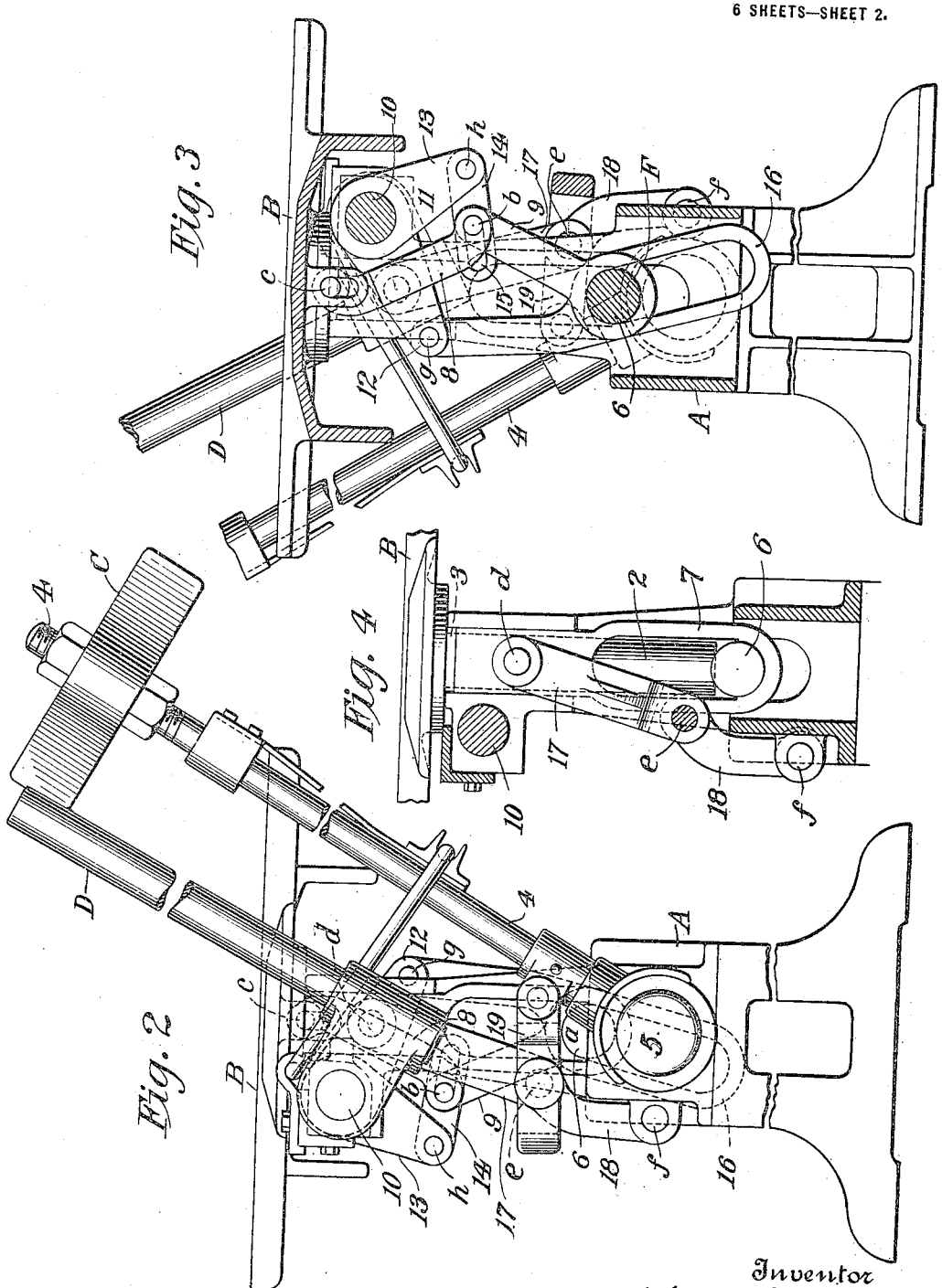

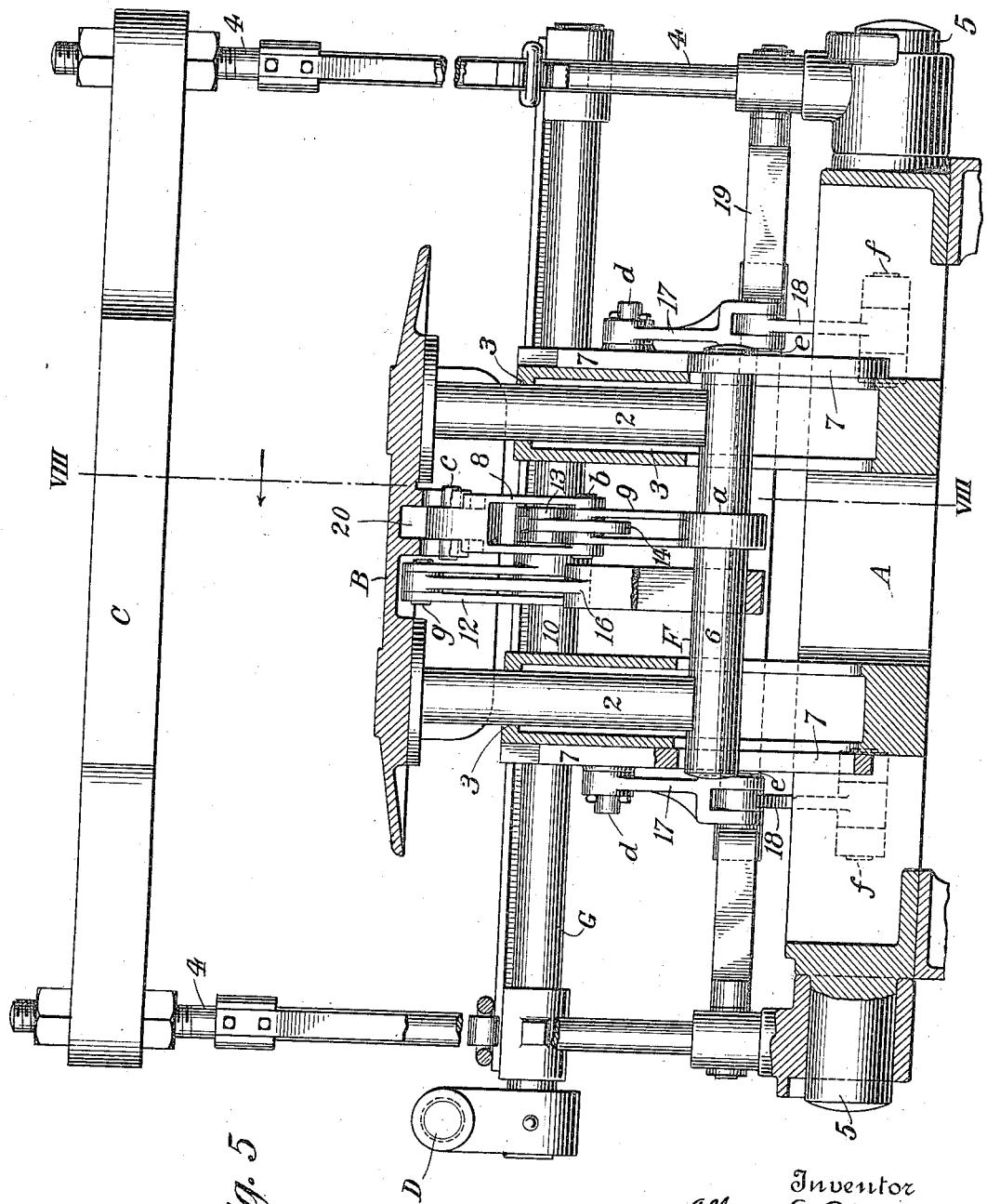

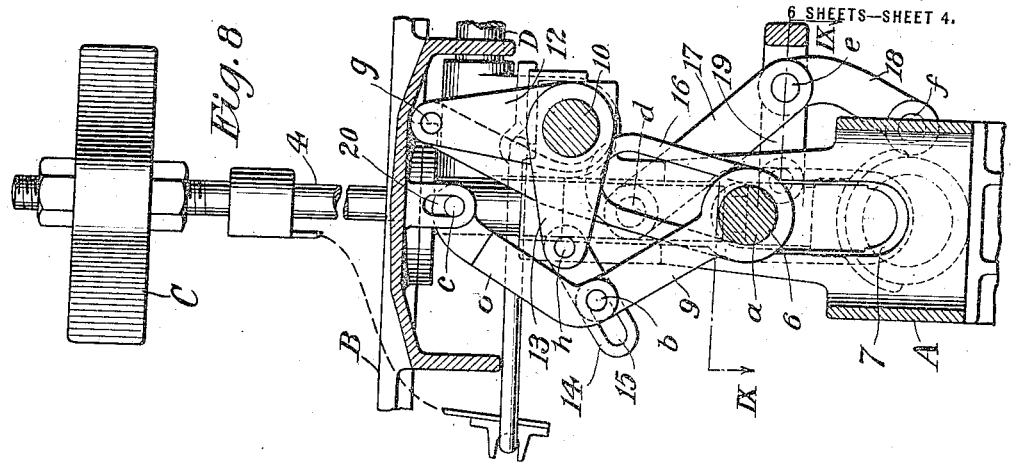
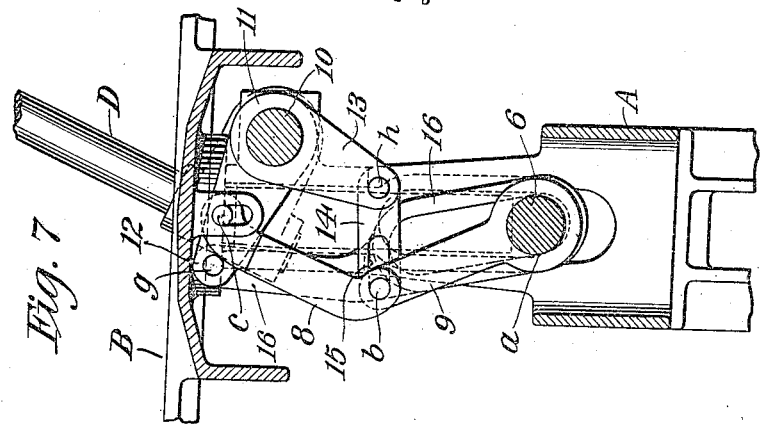
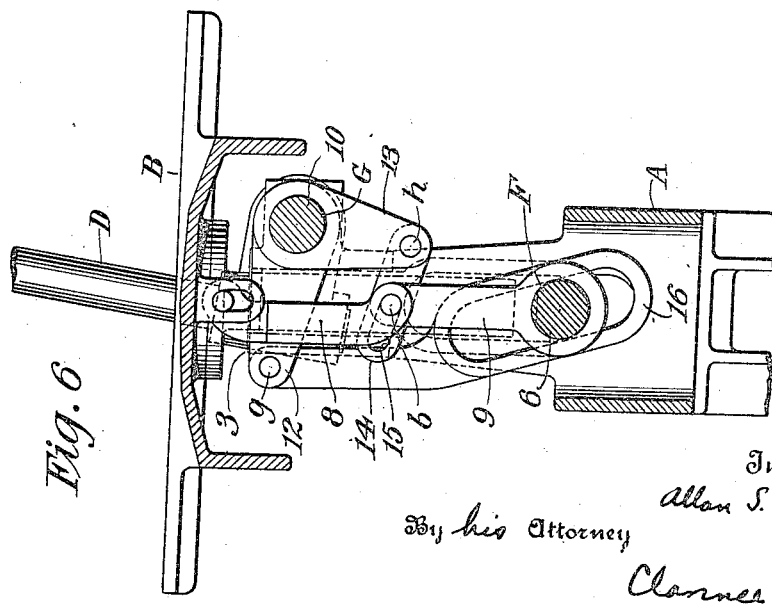

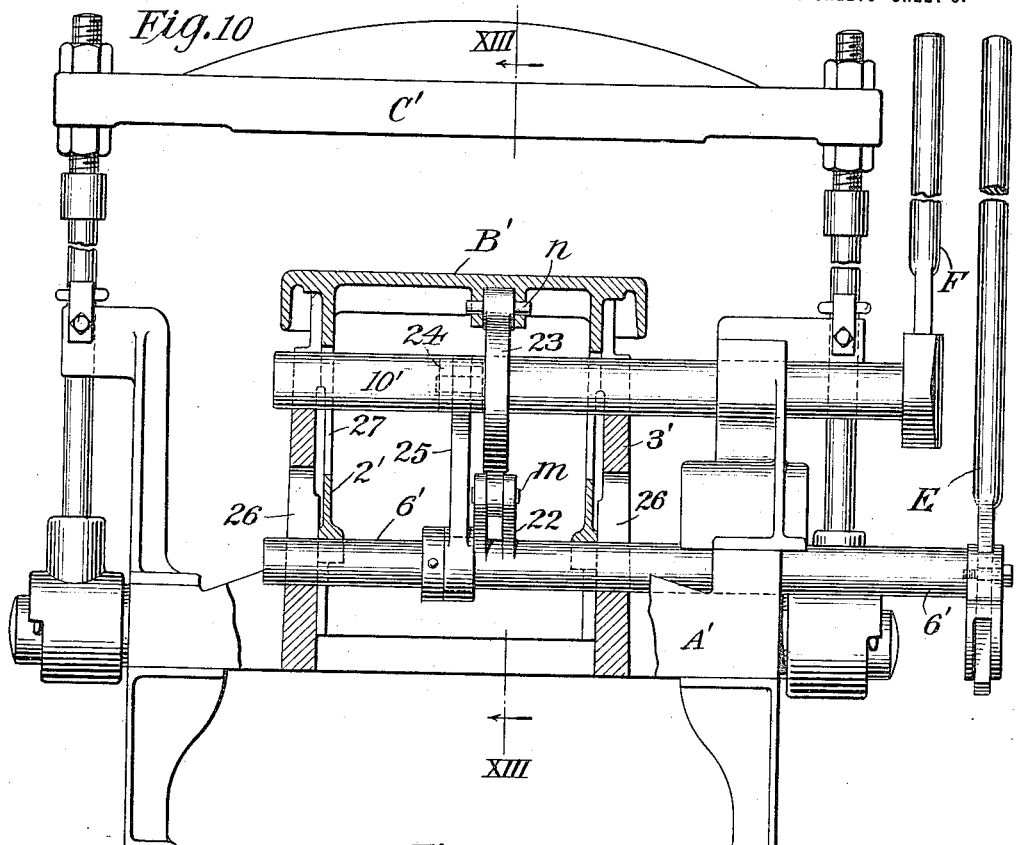
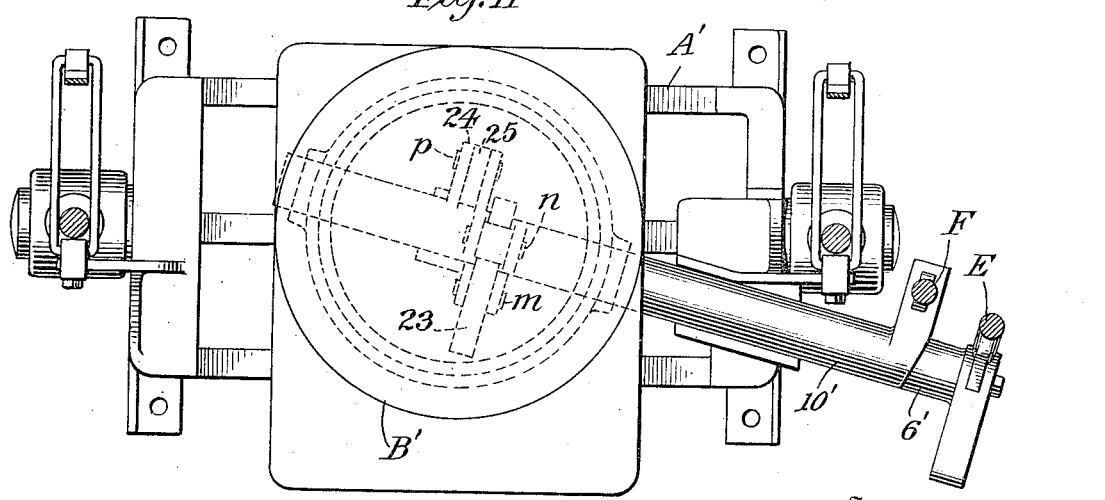

A. S. BIXBY.
MOLDING MACHINE.
APPLICATION FILED JULY 21, 1916.

1,252,771.

Patented Jan. 8, 1918.
6 SHEETS—SHEET 6.

Inventor
Allan S. Bixby
By his Attorney

UNITED STATES PATENT OFFICE.

ALLAN S. BIXBY, OF INDIANAPOLIS, INDIANA, ASSIGNOR TO THE NATIONAL MALLEABLE CASTINGS COMPANY, OF CLEVELAND, OHIO, A CORPORATION OF OHIO.

MOLDING-MACHINE.

1,252,771.  Specification of Letters Patent.  Patented Jan. 8, 1918.

Application filed July 21, 1916.  Serial No. 110,441.

*To all whom it may concern:*

Be it known that I, ALLAN S. BIXBY, a citizen of the United States, and a resident of Indianapolis, Marion county, Indiana, have invented new and useful Improvements in Molding-Machines, of which the following is a specification, reference being had to the accompanying drawings, in which—

Figure 12:
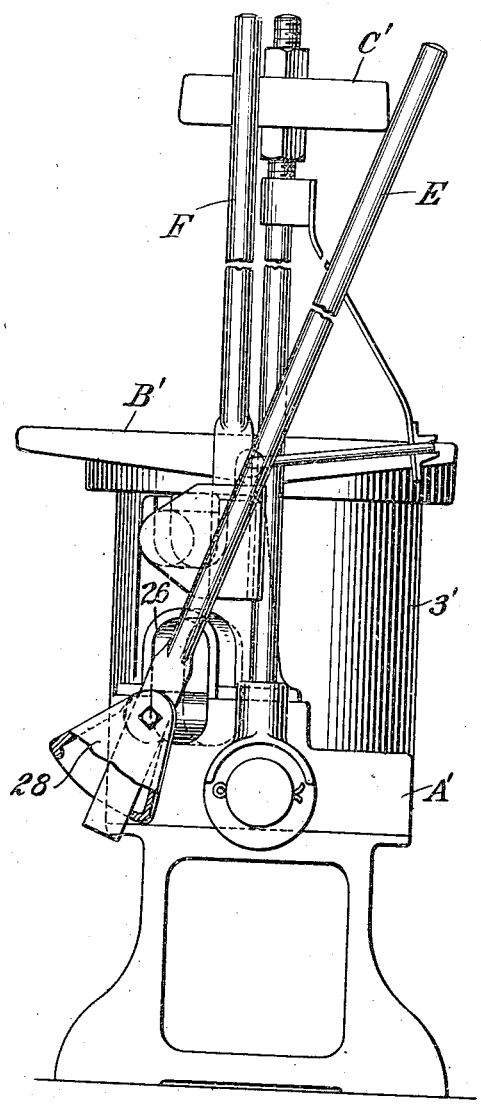
Figure 13:
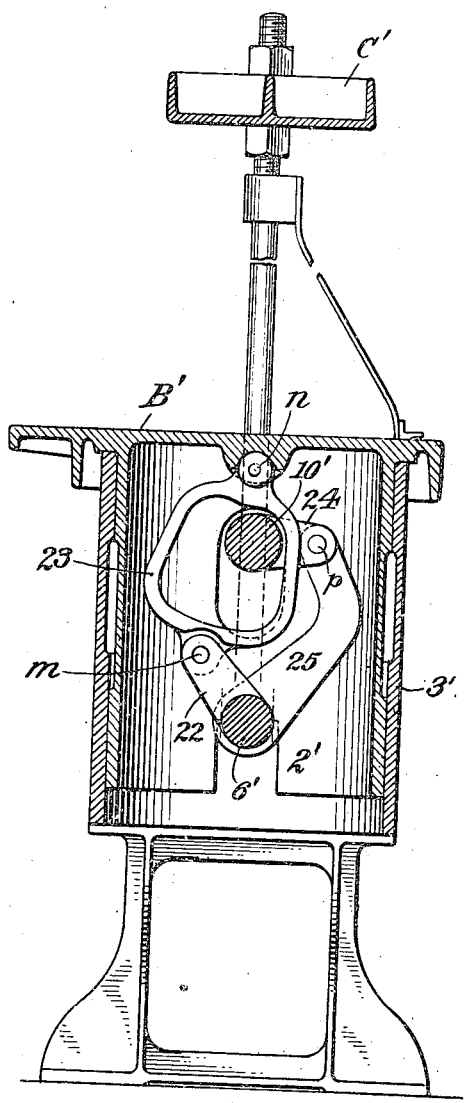

Figure 1 is a front elevation showing a molding machine constructed in accordance with my invention, with the parts in jarring position; Fig. 2 is an end elevation taken from the right-hand side of Fig. 1; Fig. 3 is a section on lines III—III of Fig. 1; Fig. 4 is a section on lines IV—IV of Fig. 1; Fig. 5 is a longitudinal vertical section showing the machine in squeezing position; Figs. 6 and 7 are sections on lines III—III of Fig. 1, showing the machine in two different jolting positions; Fig. 8 is a section on line VIII—VIII of Fig. 5; Fig. 9 is a partial section on lines IX—IX of Fig. 8; Fig. 10 is a vertical longitudinal section of a modified form of my invention; Fig. 11 is a plan view, partly in section; Fig. 12 is an end elevation thereof, and Fig. 13 is a section on lines XIII—XIII of Fig. 10.

My invention relates to molding machines, and consists in mechanism for effecting the jolting and squeezing operations. My invention also consists in the construction and coöperation of the various parts, which I shall hereinafter describe and claim.

Referring to the drawings, A indicates the base upon which the machine is mounted, B the table upon which the molds are placed, and C the bail against which the molds are squeezed by the table. The mechanism is operated by the hand lever D. The table B is mounted to reciprocate vertically with reference to the base, and is guided in its vertical movement by means of the rods 2, which are secured to and depend from the table and reciprocate in suitable sockets or sleeves 3 in the base A. The bail C is mounted on bail side rods 4, which are pivoted to the studs 5 in the base A.

The principal operating mechanism of the machine consists in a table-jarring toggle *a*, *b* and *c*, a toggle *d*, *e* and *f* for throwing out of operation the table-jarring toggle, and a lever 11 and link 16 for squeezing. The base of the table-jarring toggle *a*, *b* and *c* consists in the shaft 6, which is supported by the stirrup castings 7, to which I shall later refer. The toggle *a*, *b*, *c* is formed of the links 8 and 9, which are pivoted together at *b*, the link 9 being pivoted to the shaft 6 at *a*, and the link 8 to the table B at *c*. Secured to the shaft 10 is a bell crank lever 11, having arms 12 and 13, the arm 13 of which is pivoted at *h* to a link 14, which, at its opposite end, has an elongated slot 15, by which it is secured to the pivot *b* connecting the links 8 and 9, and the other arm 12 of the lever is connected at *g* to a stirrup-shaped link 16, which embraces the shaft 6.

The toggle *d*, *e*, *f* for throwing out of operation the table-jarring toggle consists of the links 17 and 18. Each link 17 is pivoted to a stirrup casting 7 at *d* and to a link 18 at *e*. Each link is pivoted at *f* to the base A of the machine. The link 19 connects the central pivot *e* of the toggle with each bail side rod 4.

The squeezing mechanism consists of the bell crank lever 11 and the stirrup-shaped link 16. The link 16 embraces the shaft 6 and is pivoted to the bell crank lever 11 at *g*, while the bell crank lever is pivoted to the shaft 10. During the jarring operation, the movement of the bell crank lever 11 does not affect the shaft 6, but when the movement of the hand lever D (by which rotation of the shaft 10 is secured) is continued, the arm 12 will be swung upwardly beyond the position shown in Fig. 7 and will draw with it the stirrup-shaped link 16, which will lift the shaft 6 into the position shown in Figs. 5 and 8, and the shaft 6, in its upward movement, engages the lower ends of the rods 2, causing them and the table to rise with it and squeeze the mold against the bail C, which has previously been rotated into the position shown in Fig. 8.

The operation of the jolting mechanism is as follows:

With the hand lever D in the position shown in Figs. 1, 2 and 3, the molder pulls it to the right (referring to Fig. 3), which causes the shaft 10 to rotate, which in turn revolves the bell crank lever 11, which, through the link 14, straightens out the links 8 and 9 of the toggle $a, b, c$, as is shown in Fig. 6, thus moving the table B upwardly. As the lever D is pulled still farther to the right into the position shown in Fig. 7, the toggle $a, b, c$, because of the weight of the table and the mold thereon, will break sharply to the left and will let the table down with a sudden fall or jolt upon the sockets 3 of the base A, thus bringing the parts into the position shown in Fig. 7. The elongated slot 15 in the link 14 permits the jolting to be effected without further movement of the shaft 10 or hand lever D than is necessary to carry the toggle $a, b, c$ past its center.

When the parts have reached the position shown in Fig. 7, the molder pushes the lever D to the left and the link 14, actuated by the bell crank lever 11, pulls the toggle to the right, lifting the table, as is shown in Fig. 6, and then breaking to the right and jolting down into the position shown in Fig. 3, into which position the link 14 again permits the parts to drop without further movement of the bell crank lever 11 and hand lever D. It will thus be seen that the table and mold may be jarred as many times and as rapidly as is desired, simply by pulling and pushing the hand lever, thereby causing it to rotate the shaft 10, and alternately break the table-lifting toggle $a, b, c$ in opposite directions.

Having jarred the mold a sufficient number of times, the next operation is squeezing. The bail C is first raised to vertical position over the flask containing the mold, and such action at the same time renders the table-lifting toggle $a, b, c$ inoperative, since the movement of the bail side rods 4 causes the link 19 to break the toggle $d, e$ and $f$, as it is attached to the central pivot $e$ thereof. As the toggle $d, e, f$ is attached to the base A by the pivot $f$, the breaking of the toggle will draw down the upper pivot point $d$ and with it the stirrup casting 7, and hence will lower the shaft 6 for which the stirrup 7 forms the support. As the shaft 6 forms the base of reaction for the toggle $a, b, c$, the toggle is lowered with it, which is permitted by the slot 20, by which the pivot $c$ is attached to the table B, and, when the shaft 6 is lowered, the toggle $a, b, c$, is rendered inoperative, since it no longer has a base against which it may react.

When the bail C is in vertical position, the operator pulls the lever D toward him, thus rotating the shaft 10, which swings the arm 12 of the bell crank 11 upwardly, causing the stirrup-shaped link 16 to be drawn up, thus lifting the shaft 6, as is shown in Fig. 8. The shaft 6 in turn engages the lower ends of the rods 2 (as is shown in Fig. 5), causing them and the table B, to which they are attached, to rise and squeeze the mold against the bail C. Rotation of the lever D in the opposite direction will lower the table, and when the bail has been swung down into the position shown in Figs. 1, 2 and 3, and the mold removed, the mechanism is again ready for jarring a new mold.

In Figs. 10, 11, 12 and 13 I have shown a modification of my invention, in which two hand levers E and F are employed, the lever E being employed for jarring and the lever F for squeezing. The table B is mounted on a cylinder 2', which is in the form of a hollow piston, operating inside of a large cylindrical socket or guide 3' mounted on the base A' and containing the mechanism for the jarring and squeezing operations. The jarring lever E is connected to the shaft 6', and the squeezing lever F to the shaft 10'.

In jarring the partial revolution of the shaft 6' rotates the arm 22, to the end of which is pivoted at $m$ a link 23, which is loop-shaped to avoid interference with the shaft 10'. The upper end of the loop-shaped link 23 is pivoted to the mold table at $n$. It will thus be seen that the arm 22 and link 23 form a toggle joint with the elbow at $m$, the fixed base of resistance at the shaft 6', and the movable thrust point at $n$, which is similar to the toggle $a, b, c$, shown in the preferred form of my invention.

In jarring, the lever E is moved forward and then back, which imparts rotary movement first in one direction and then in the other, to the shaft 6'. On the forward stroke of the lever E the toggle will first lift the table B' and then, as the toggle passes its center point, it will break in the opposite direction at $m$, and the table will drop with a jar, and then, as the lever E is pulled back, the toggle will again lift the table until it has again passed its center and will again drop the table and jar the mold thereon. To prevent the lever E from being knocked out of the hand of the operator by the jar of the table, it is pivoted to the shaft 6' in the sleeve 28 which permits the lever to have a limited angular movement independent of the rotation of the shaft.

In squeezing the molder pulls forward the lever F (to the left in Fig. 12), thus rotating the shaft 10' and the arm 24 which is secured thereto. Pivoted to the arm 24 at $p$ is an elbow link 25, which, at its lower end, is pivoted to the shaft 6'. As the arm 24 is rotated by the shaft 10' it will lift the shaft 6' through the link 25, and the shaft 6' will in turn lift the cylinder 2' and with it the table B', to squeeze the mold against the bail C. The socket 3' has slots 26 to permit such lifting of the shaft 6', and the cylinder 2' is likewise slotted at 27 to permit its upward movement relative to the shaft 10'.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In mechanism for making molds, a mold table, a jarring toggle having one link secured to the mold table and the other link secured to a fixed base of resistance, an actuating member connected to the toggle, and means for rendering the jarring toggle inoperative to permit squeezing.

2. In mechanism for making molds, a mold table mounted to be reciprocated vertically, a vertically movable support, a toggle secured to the table at one end and to the support at the other end, means for actuating the toggle to break it alternately in opposite directions to jar the table, means for rendering the jarring toggle inoperative, a rotating shaft connected to the support, whereby rotation of the shaft will elevate the support and with it the table for squeezing.

3. In mechanism for making molds, a mold table mounted to reciprocate vertically, a vertically slidable shaft, a toggle secured to the table and shaft, said shaft being adapted during jarring to act as a base of resistance for the toggle, and during squeezing as a support for the table.

4. In mechanism for making molds, a mold table, a jarring toggle having one link secured to the mold table and the other link secured to a base of resistance, an actuating shaft having a connection with the toggle by which the toggle on revolution of the shaft is made to break alternately in opposite directions to jar the table.

5. In mechanism for making molds, a mold table mounted to reciprocate vertically, a bail positioned above the table, an actuating shaft, said shaft being connected to a support for the table and being adapted to lift the support upon revolution of the shaft to squeeze the molds on the table against the bail, said shaft being also adapted to operate other connecting mechanism between the shaft and the support for jarring the table.

6. In mechanism for making molds, a frame, a mold table, a movable support for the table, bail side rods supporting a bail above the mold table pivotally mounted on the frame, an actuating shaft having a bell crank lever mounted thereon, a connection between the bell crank lever and the table support by which rotation of the lever imparts vertical movement to the support, and a toggle member connected to the lever, the table and said support, and a second toggle member secured to the bail side rods, said second toggle member being movable into and out of position to provide a point of support for the support to act as a base of resistance of the first mentioned toggle.

7. In mechanism for making molds, a mold table mounted to be reciprocated vertically, a vertically movable member in one position being movable with the table and in another position relatively thereto, a toggle secured to the table and to the movable member, an actuating shaft having slotted connections with the toggle and the movable member to permit the separate actuation of the toggle and movable member by said shaft.

8. In mechanism for making molds, a mold table, a supporting member by which the mold table is moved vertically, an actuating shaft having a lever arm thereon, a stirrup shaped link connecting the movable member and the lever arm, the actuation of the shaft being adapted to lift the movable member and with it the mold table for squeezing.

9. In mechanism for making molds, a frame, a table having a depending stem, a sleeve in the frame within which the stem reciprocates, a shaft having a supporting engagement with the stem in one position and in another position affording a base of resistance for a toggle, said toggle being pivoted to the shaft and the table and having an intermediate connection with an actuating member, means for moving the shaft out of position as a base of resistance for the toggle, and an actuated member connected to the shaft by which the shaft and with it the table is lifted for squeezing.

10. In mechanism for making molds, a mold table mounted to be reciprocated vertically, squeezing and jarring mechanisms, one of said mechanisms having a toggle one link of which is secured to the mold table, an actuating shaft connected to said toggle, and means for rendering the jarring mechanism operative when the squeezing members are inoperative, and vice versa.

11. In mechanism for making molds, a mold table mounted to be reciprocated vertically, an operating shaft, squeezing means connecting the table and the shaft, said means comprising a pair of links, means for jarring the table comprising a lever mounted on said shaft, having a connection with the table, and means for rendering the jarring mechanism operative when the squeezing members are inoperative, and vice versa.

ALLAN S. BIXBY.

Copies of this patent may be obtained for five cents each, by addressing the "Commissioner of Patents, Washington, D. C."